United States Patent
Davey

(10) Patent No.: US 10,925,008 B2
(45) Date of Patent: Feb. 16, 2021

(54) NETWORK PERFORMANCE IN HIGH DENSITY ENVIRONMENTS

(71) Applicant: Comcast Cable Communications, LLC, Philadelphia, PA (US)

(72) Inventor: James Henry Davey, Dawsonville, GA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/823,694

(22) Filed: Aug. 11, 2015

(65) Prior Publication Data
US 2017/0048805 A1   Feb. 16, 2017

(51) Int. Cl.
*H04W 52/24* (2009.01)
*H04B 17/318* (2015.01)

(52) U.S. Cl.
CPC ........ *H04W 52/241* (2013.01); *H04B 17/318* (2015.01); *H04W 52/242* (2013.01); *H04W 52/245* (2013.01)

(58) Field of Classification Search
CPC .............. H04W 52/325; H04W 48/20; H04W 52/0219; H04W 52/0245; H04W 52/246; H04W 52/247; H04W 52/241; H04W 52/245; H04W 52/242; H04B 17/318
USPC ..................... 455/522, 13.4, 127.1
See application file for complete search history.

(56) References Cited

U.S. PATENT DOCUMENTS

| | | | | |
|---|---|---|---|---|
| 3,349,328 A * | 10/1967 | Hunkins | ................. | H04L 27/24 375/278 |
| 5,109,538 A * | 4/1992 | Ikonen | ................. | H03G 3/3042 455/116 |
| 5,697,081 A * | 12/1997 | Lyall, Jr. | ............. | H03G 3/3052 330/149 |
| 5,963,855 A * | 10/1999 | Lussenhop | ........... | H03G 1/0088 455/217 |
| 8,817,695 B1 * | 8/2014 | Rai | ........................ | H04W 52/48 370/235 |
| 2003/0184377 A1 * | 10/2003 | Harberts | ............... | H03M 1/188 330/254 |
| 2007/0222578 A1 * | 9/2007 | Iwamura | ................. | G08B 25/04 340/538 |
| 2009/0041477 A1 * | 2/2009 | Alwan | ............... | H04B 10/0799 398/202 |
| 2012/0109261 A1 * | 5/2012 | Stancer | .................. | A61N 1/025 607/60 |
| 2012/0225626 A1 * | 9/2012 | White | ...................... | H04B 1/48 455/79 |
| 2012/0250740 A1 * | 10/2012 | Ling | ................... | H04W 88/085 375/219 |

(Continued)

*Primary Examiner* — Will W Lin
(74) *Attorney, Agent, or Firm* — BakerHostetler

(57) ABSTRACT

Systems and methods for managing a network are disclosed. One method can comprise determining signal information relating to a first network device such as an access point. The signal information may be associated with signal characteristics such as a radio frequency signal strength over a communication channel. An attenuation value for one or more receiving paths of the first network device may be determined using the signal information. The one or more receiving paths of the first network device may be attenuated based on the determined attenuation value. A transmission power of the first network device may be configured based on the determined attenuation value.

20 Claims, 6 Drawing Sheets

(56) References Cited

U.S. PATENT DOCUMENTS

2013/0072111 A1\* 3/2013 Gunnarsson ....... H04B 7/15578
 455/9
2013/0100830 A1\* 4/2013 Brady ..................... H04L 43/50
 370/252
2013/0337847 A1\* 12/2013 Sridhara ............... G01S 13/876
 455/456.6

\* cited by examiner

NETWORK PERFORMANCE IN HIGH DENSITY ENVIRONMENTS

BACKGROUND

A network such as a local area network can comprise one or more network devices such as access points (AP) to provide a means for one or more user devices to communicate with and/or over the network. A network device can comprise a device that allows wired and/or wireless user devices to connect to a wired network using Wi-Fi, Bluetooth, or related technologies. A network device can be configured to provide access to one or more services (e.g., private network, public network, network-related services). In certain locations such as multi-dwelling units, where hundreds of network devices may be present, network devices can provide interfering wireless signals and excessive demand for access to the channel. These and other shortcomings are addressed by the present disclosure.

SUMMARY

In an aspect, methods can comprise determining signal information relating to a first network device such as an access point. The signal information may be associated with signal characteristics such as a radio frequency signal strength over a communication channel. An attenuation value for one or more receiving paths of the first network device may be determined using the signal information. The one or more receiving paths of the first network device may be attenuated based on the determined attenuation value. A transmission power of the first network device may be configured based on the determined attenuation value.

In another aspect, methods can comprise receiving signal information relating to one or more received signals on a communication channel associated with a first network device. As an example, at least a portion of the signal information is associated with a radio frequency signal strength over the communication channel. An attenuation value can be determined for one or more receiving paths of the first network device. The one or more receiving paths of the first network device can be attenuated based on the determined attenuation value.

In a further aspect, a network device can comprise one or more receiving paths configured to receive a plurality of radio frequency signals. An attenuator can be configured to attenuate one or more signals of the plurality of radio frequency signals based on at least a distribution of signal strengths of the plurality of radio frequency signals. A transmitter can be configured to transmit a radio frequency signal at a transmission power based on the attenuation effected by the attenuator.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

The methods and systems described herein, in one aspect, can allow a network device such as a wireless access point to access a network channel, while minimizing the impact of competing devices that share communication over the same network channel. As an example, the network device can attenuate one or more co-channel signals below a receiver noise floor, thus making a carrier sense mechanism of the network device immune to the presence of the competing co-channel signals. As another example, the network device can configure a transmitter power based on the attenuation applied to the received signals (e.g., dB-for-dB with the value of attenuation placed in the receive path(s)). This may ensure that the network device reciprocates with other network devices sharing the channel. As such, the network performance (e.g., downlink performance) of the network device can be improved by trading off an amount of downlink power at the receiver of the network device for significantly less channel congestion. In dense radio frequency (RF) environments, such as multi-story apartment buildings, where downlink signal strengths are strong to connected clients, this tradeoff offers significant opportunity for the network device to gain access to the channel for downlink transmissions.

Figure 1:
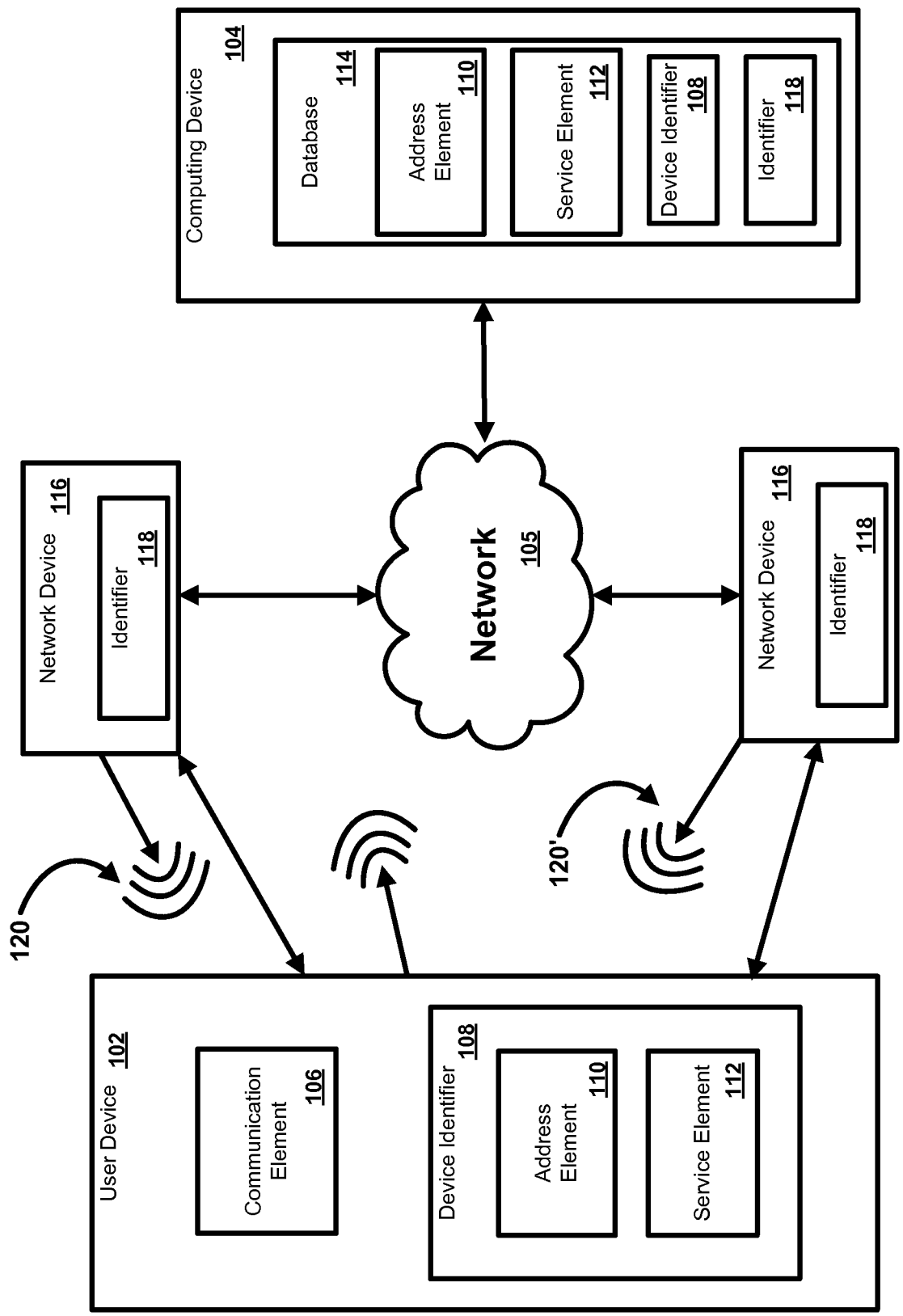
FIG. 1 is a block diagram of an exemplary system and network.

In one aspect of the disclosure, a system can be configured to provide services such as network-related services. FIG. 1 illustrates various aspects of an exemplary environment in which the present methods and systems can operate. The present disclosure is relevant to systems and methods for providing services to a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104, such as a server, for example. The computing device 104 can be disposed locally or remotely relative to the user device 102. As an example, the user device 102 and the computing device 104 can be in communication via a private and/or public network 105, such as the Internet. Other forms of communications can be used, such as wired and wireless telecommunication channels, for example.

In an aspect, the user device 102 can be an electronic device, such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving a user feedback, such as a application client or a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device, such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device, such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a MAC address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network and/or location.

In an aspect, the service element 112 can comprise an identification of a service provider associated with the user device 102 and/or with the class of user device 102. As an example, the service element 112 can comprise information relating to or provided by a communication service provider (e.g., Internet service provider) that is providing or enabling communication services to the user device 102. As a further example, the service element 112 can comprise information relating to a preferred service provider for one or more particular services relating to the user device 102. In an aspect, the address element 110 can be used to identify or retrieve the service element 112, or vise versa. As a further example, one or more of the address element 110 and the service element 112 can be stored remotely from the user device 102 and retrieved by one or more devices, such as the user device 102 and the computing device 104. Other information can be represented by the service element 112.

In an aspect, the computing device 104 can be a server for communicating with the user device 102. As an example, the computing device 104 can communicate with the user device 102 for providing services. In an aspect, the computing device 104 can allow the user device 102 to interact with remote resources, such as data, devices, and files. As an example, the computing device can be configured as central location (e.g., a headend, or processing facility), which can receive content (e.g., data, input programming) from multiple sources. The computing device 104 can combine the content from the various sources and can distribute the content to user (e.g., subscriber) locations via a distribution system.

In an aspect, the computing device 104 can manage the communication between the user device 102 and a database 114 for sending and receiving data therebetween. As an example, the database 114 can store a plurality of data sets (e.g., mapped identifiers, relational tables, user device identifiers (e.g., identifier 108) or records, network device identifiers (e.g., identifier 118), or other information). As a further example, the user device 102 can request and/or retrieve a file from the database 114. In an aspect, the database 114 can store information relating to the user device 102, such as the address element 110 and/or the service element 112. As an example, the computing device 104 can obtain the device identifier 108 from the user device 102 and retrieve information from the database 114, such as the address element 110 and/or the service elements 112. As another example, the computing device 104 can obtain the address element 110 from the user device 102 and can retrieve the service element 112 from the database 114, or vice versa. As a further example, the computing device 104 can obtain a MAC address from the user device 102 and can retrieve a local IP address from the database 114. As such, the local IP address can be provisioned to the user device 102, for example, as the address element 110 to facilitate interaction between the user device 102 and a network (e.g., LAN). Any information can be stored in and retrieved from the database 114. The database 114 can be disposed remotely from the computing device 104 and accessed via direct or indirect connection. The database 114 can be integrated with the computing device 104 or some other device or system.

In an aspect, one or more network devices 116 can be in communication with a network, such as network 105. As an example, one or more of the network devices 116 can facilitate the connection of a device, such as user device 102, to the network 105. As a further example, one or more of the network devices 116 can be configured as a network gateway. In an aspect, one or more network devices 116 can be configured to allow one or more wireless devices to connect to a wired and/or wireless network using Wi-Fi, Bluetooth or similar standard.

In an aspect, the network devices 116 can be configured to transmit and receive wireless signals (e.g., RF signals) over a particular frequency band. Such bands can include 2.4 GHz band, 5 Ghz band, and 60 GHz band among others. The frequency band can be defined by one or more communication protocols or standards such as 802.xx (e.g., 802.11ac, n, a, b, g, etc.). Each of the frequency bands can be sub-divided into one or more communication channels. As an example, the 2.4 GHz band can comprise frequencies between 2400 MHz and 2500 MHz and can be divided into 14 sub channels (e.g., 20 MHz sub-band channels). As such, each of the network devices 116 can be configured to transmit and receive wireless signals over a select one or more of the channels of a particular frequency band.

In an aspect, the network devices 116 can be configured as a mesh network. As an example, one or more network devices 116 can comprise a dual band wireless network device. As an example, the network devices 116 can be configured with a first service set identifier (SSID) (e.g., associated with a user network or private network) to function as a local network for a particular user or users. As a further example, the network devices 116 can be configured with a second service set identifier (SSID) (e.g., associated with a public/community network or a hidden network) to function as a secondary network or redundant network for connected communication devices.

In an aspect, one or more network devices 116 can comprise an identifier 118. As an example, one or more identifiers can be a media access control address (MAC address). As a further example, one or more identifiers 118 can be a unique identifier for facilitating communications on the physical network segment. In an aspect, each of the network devices 116 can comprise a distinct identifier 118.

As an example, the identifiers 118 can be associated with a physical location of the network devices 116.

In an aspect, the user device 102 can connect to a first network, such as a LAN associated with a first SSID, via a network device (e.g., network device 116, gateway device, computing device 104, server, router, etc.) As an example, the user device 102 can discover a beacon 120 transmitted (e.g., wirelessly) by the network device 116. The beacon 120 can comprise a beacon frame. The beacon 120 can comprise information to facilitate a connection between the user device 102 and the network device 116. As a further example, a second beacon 120' can be transmitted by another network device 116 over the same or different communication channel as the beacon 120.

In an aspect, as more user devices 102 discover the beacons 120, 120' and communicate over the same channel, the co-signals being transmitted over the same channel can cause congestion and poor network performance for one or more of the user devices 102. The methods and systems described herein can use an RF scan to determine a number of signal transmissions (e.g., service set identifiers (SSID)) that are being transmitted via one or more communication channels. The RF scan can also determine a received signal strength indicator (RSSI) associated with one or more of the SSIDs. As an example, a distribution of RSSI (signal strength) can be determined for one or more of the network devices 116. As another example, a distribution of RSSI (signal strength) can be determined from one or more user devices 102 (e.g., clients) that have connected to the one or more network devices 116 (e.g., via storage of a history of connected client's uplink RSSI). Upon activation, many network devices 116 may scan all possible channels to determine an optimal operating channel as part of an auto-channel-select feature. Data from this scan may form a distribution of RSSI values. The RSSI distribution can be updated through the ongoing RSSI measurement of on-channel beacons 120. Thus, the RF environment of the network device 116 can be discovered. Inasmuch as network devices 116 are generally stationary, the measured RSSI values may have a small variation and can be sampled and refreshed periodically. From this data set, a distribution of RSSI values from other network devices 116 may be stored.

Based on one or more of the determined distributions of RSSI, the one or more network devices 116 can attenuate one or more co-channel signals by a value to make the carrier sense mechanism of the one or more network devices 116 immune to the presence of the competing co-channel signals. Various strategies can be employed to determine the optimal amount of attenuation. One strategy is to determine the attenuation to exclude the bottom "x-percentile" of neighboring network devices 116, where "x" is a configurable parameter. In high-density environments, a large number of network devices may be received near the noise floor (e.g., −90 dB) of the network device 116. Another strategy is to exclude the network devices within "x-dB" of the noise floor, where "x" is a configurable parameter.

In certain aspects, the one or more network devices 116 can configure a transmitter power based on the attenuation applied to the received signals (e.g., dB-for-dB with the value of attenuation placed in the receive path(s)). This may ensure that the network devices 116 reciprocate with other network devices 116 sharing the channel. As such, the network performance (e.g., downlink performance) of the network devices 116 can be improved by trading off an amount of downlink power at the receiver of the network device for less channel congestion. As another example, the receiving paths of the network devices 116 can be attenuated via one or more programmable electronic attenuators (e.g., stepped, updated, self-adapting, etc.), one or more PIN diodes (e.g., diode switched attenuator), and may be controlled locally or via upstream intelligence. As a further example, the network devices 116 can have a configurable limit imposed by a vendor or network operator to limit the extent of adjustment to receiver sensitivity and transmit power, or incremental amounts of compensation that can be imposed by the user or network operator to improve performance where channel activity exceeds a threshold.

Figure 2:
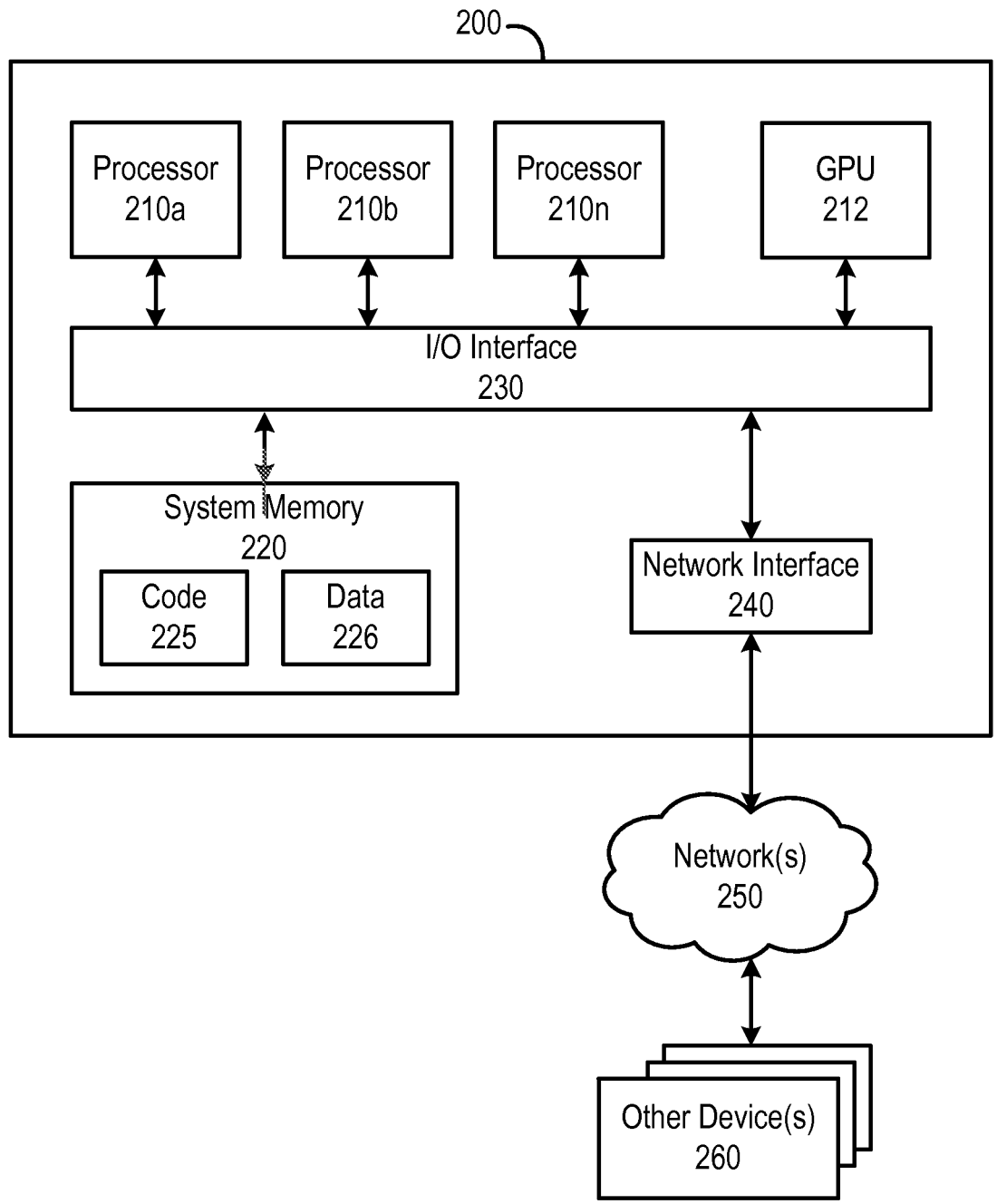
FIG. 2 is a block diagram of an exemplary computing device.

In an exemplary aspect, the methods and systems can be implemented on a computing system, such as computing device 200 as illustrated in FIG. 2 and described below. By way of example, one or more of the user device 102 and the computing device 104 of FIG. 1 can be embodied as the computing device 200 as illustrated in FIG. 2. Similarly, the methods and systems disclosed can utilize one or more computers to perform one or more functions in one or more locations. FIG. 2 depicts a general-purpose computer system that includes or is configured to access one or more computer-accessible media. In the illustrated aspect, a computing device 200 may include one or more processors 210a, 210b, and/or 210n (which may be referred herein singularly as the processor 210 or in the plural as the processors 210) coupled to a system memory 220 via an input/output (I/O) interface 230. The computing device 200 may further include a network interface 240 coupled to an I/O interface 230.

In various aspects, the computing device 200 may be a uniprocessor system including one processor 210 or a multiprocessor system including several processors 210 (e.g., two, four, eight, or another suitable number). The processors 210 may be any suitable processors capable of executing instructions. For example, in various aspects, the processor(s) 210 may be general-purpose or embedded processors implementing any of a variety of instruction set architectures (ISAs), such as the x86, PowerPC, SPARC, or MIPS ISAs, or any other suitable ISA. In multiprocessor systems, each of the processors 210 may commonly, but not necessarily, implement the same ISA.

In some aspects, a graphics processing unit ("GPU") 212 may participate in providing graphics rendering and/or physics processing capabilities. A GPU may, for example, include a highly parallelized processor architecture specialized for graphical computations. In some aspects, the processors 210 and the GPU 212 may be implemented as one or more of the same type of device.

The system memory 220 may be configured to store instructions and data accessible by the processor(s) 210. In various aspects, the system memory 220 may be implemented using any suitable memory technology, such as static random access memory ("SRAM"), synchronous dynamic RAM ("SDRAM"), nonvolatile/Flash®-type memory, or any other type of memory. In the illustrated aspect, program instructions and data implementing one or more desired functions, such as those methods, techniques and data described above, are shown stored within the system memory 220 as code 225 and data 226.

In one aspect, the I/O interface 230 may be configured to coordinate I/O traffic between the processor(s) 210, the system memory 220 and any peripherals in the device, including a network interface 240 or other peripheral interfaces. In some aspects, the I/O interface 230 may perform any necessary protocol, timing or other data transformations to convert data signals from one component (e.g., the system memory 220) into a format suitable for use by another component (e.g., the processor 210). In some aspects, the I/O interface 230 may include support for devices attached through various types of peripheral buses, such as a variant of the Peripheral Component Interconnect (PCI) bus standard or the Universal Serial Bus (USB) standard, for example. In some aspects, the function of the I/O interface 230 may be split into two or more separate components, such as a north bridge and a south bridge, for example. Also, in some aspects some or all of the functionality of the I/O interface 230, such as an interface to the system memory 220, may be incorporated directly into the processor 210.

The network interface 240 may be configured to allow data to be exchanged between the computing device 200 and other device or devices 260 attached to a network or networks 250, such as other computer systems or devices, for example. In various aspects, the network interface 240 may support communication via any suitable wired or wireless general data networks, such as types of Ethernet networks, for example. Additionally, the network interface 240 may support communication via telecommunications/telephony networks, such as analog voice networks or digital fiber communications networks, via storage area networks, such as Fibre Channel SANs (storage area networks), or via any other suitable type of network and/or protocol.

In some aspects, the system memory 220 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device the 200 via the I/O interface 230. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 200 as the system memory 220 or another type of memory. Further, a computer-accessible medium may include transmission media or signals, such as electrical, electromagnetic or digital signals, conveyed via a communication medium, such as a network and/or a wireless link, such as those that may be implemented via the network interface 240. Portions or all of multiple computing devices, such as those illustrated in FIG. 2, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

Figure 3:
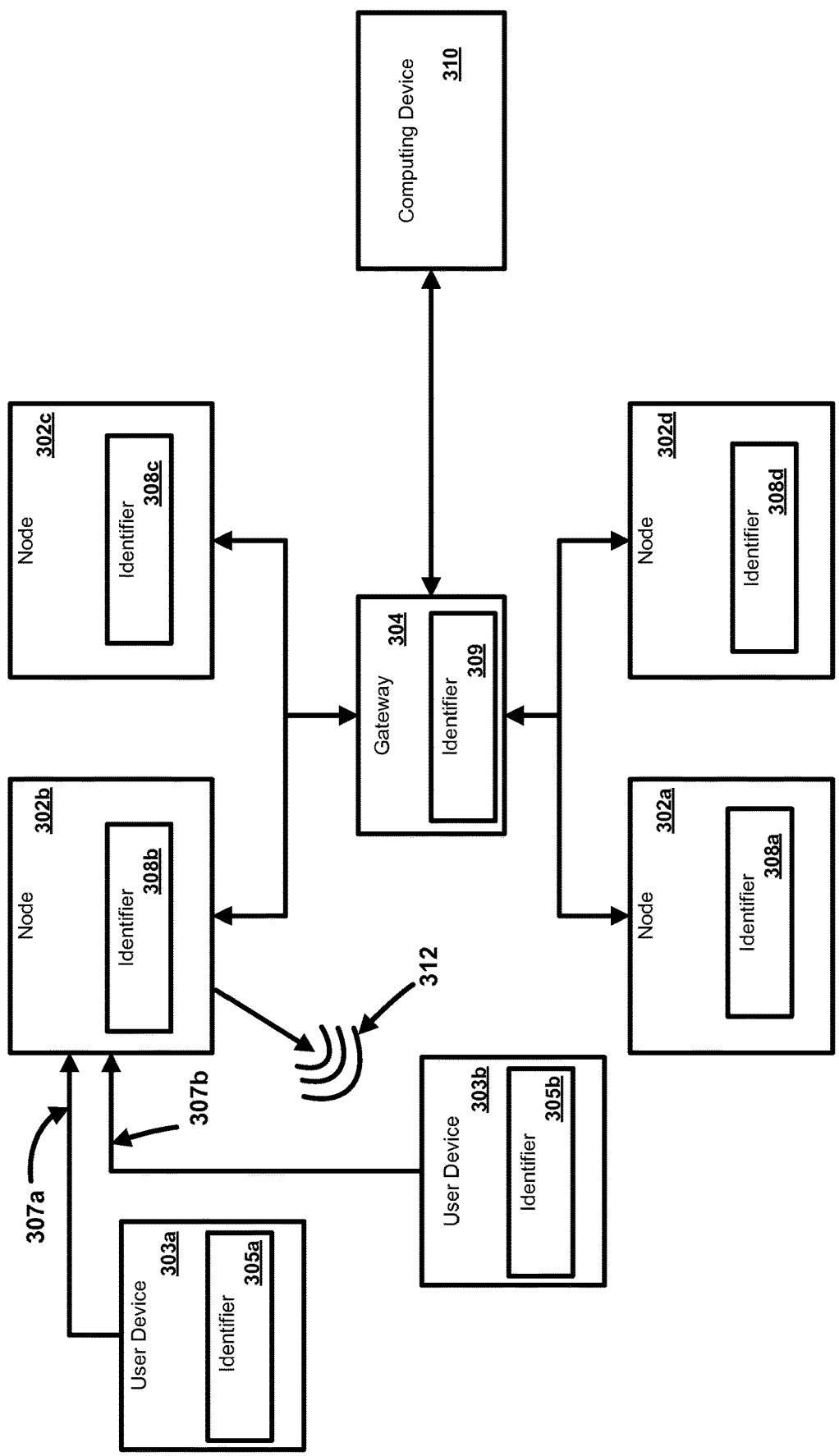
FIG. 3 is a block diagram of an exemplary system and network.

FIG. 3 illustrates an exemplary system and network. In an aspect, a plurality of nodes 302a, 302b, 302c, 302d can be in communication with one or more user devices 303a, 303b and a gateway 304. As an example, one or more nodes 302a, 302b, 302c, 302d can be a network device, router, switch, communication device, or the like. As another example, one or more user devices 303a, 303b can be an electronic device, such as a computer, a smartphone, a laptop, a tablet, a set top box, a display device, or other device capable of communicating with one or more of the nodes 302a, 302b, 302c, 302d of the network.

In an aspect, each of the user devices 303a, 303b can be associated with an identifier 305a, 305b, such as a user identifier or device identifier. As an example, the identifier 305a, 305b can be any identifier, token, character, string, or the like, for differentiating one user or user device (e.g., user device 303a, 303b) from another user or user device. In a further aspect, the identifier 305a, 305b can identify a user or user device as belonging to a particular class of users or user devices. As a further example, the identifier 305a, 305b can comprise information relating to the user device, such as a manufacturer, a model or type of device, a service provider associated with the user device 303a, 303b, a state of the user device 303a, 303b, a locator, and/or a label or classifier. Other information can be represented by the identifier 305a, 305b. In an aspect, the identifier 305a, 305b can be an internet protocol address, a MAC address, a network address, an Internet address, or the like. As an example, the identifier 305a, 305b can be relied upon to establish a communication session between the user device 303a, 303b and the computing device 310 or other devices (e.g., nodes 302a, 302b, 302c, 302d) and/or networks. As a further example, the identifier 305a, 305b can be used as an identifier or locator of the user device 303a, 303b. In an aspect, the identifier 305a, 305b can be persistent for a particular network and/or location.

In an aspect, one or more of the nodes 302a, 302b, 302c, 302d can be configured to communicate with another of the nodes 302a, 302b, 302c, 302d and/or the gateway 304 via one or more communication paths. In an aspect, the one or more communication paths can comprise one or more uninterrupted communication links, sequential links, pre-defined paths or links, and/or intervening nodes. Links can comprise a single point to point connection between two devices or network devices. Paths can comprise one or more links. As an example, one or more of the communication paths can comprise one or more of the nodes 302a, 302b, 302c, 302d. As a further example, one or more of the nodes 302a, 302b, 302c, 302d can be configured as a mesh network. In an aspect, one ore more of the communication paths can be configured to transmit one or more services. In an aspect, the nodes 302a, 302b, 302c, 302d can be configured as a network, such as a mesh network.

In an aspect, one or more of the nodes 302a, 302b, 302c, 302d can comprise an identifier 308a, 308b, 308c, 308d. As an example, one or more identifiers can be a media access control address (MAC address). Any uniquely identifiable attribute that can be linked to a location can be used as the identifier 308a, 308b, 308c, 308d. Such attributes can comprise one or more of an IP Address, serial number, latitude/longitude, geo-encoding, custom assigned unique identifier, global unique identifier (GUID), and the like. As a further example, one or more identifiers 308a, 308b, 308c, 308d can be a unique identifier for facilitating communications on the physical network segment. In an aspect, each of the nodes 302a, 302b, 302c, 302d can comprise a distinct identifier 308a, 308b, 308c, 308d. As an example, the identifiers 308a, 308b, 308c, 308d can be associated with a physical location of the nodes 302a, 302b, 302c, 302d.

In an aspect, one or more nodes 302a, 302b, 302c, 302d can be in communication with the gateway 304. As an example, one or more nodes 302a, 302b, 302c, 302d and/or the gateway 304 can be configured to allow one or more wireless devices to connect to a wired and/or wireless network using Wi-Fi, Bluetooth or similar standard. The gateway 304 can comprise an identifier 309. As an example, one or more identifiers 309 can be a media access control address (MAC address). As a further example, one or more identifiers 309 can be a unique identifier for facilitating communications on the physical network segment.

In an aspect, a computing device 310 can be in communication with a network device, such as gateway 304. As an example, the computing device 310 can be or comprise an application server, management device, auto-configuration server (ACS), AAA server, etc. In another aspect, the computing device 310 is located within a network, such as a wide area network (WAN).

In an aspect, the user devices 303a, 303b can connect to a first network via a network device, such as node 302b. As an example, the user device 303a, 303b can discover a transmission signal 312 (e.g., downlink, beacon, etc.) transmitted (e.g., wirelessly) by the node 302b. The transmission signal 312 can be transmitted over a particular frequency band. Such bands can include 2.4 GHz band, 5 Ghz band, and 60 GHz band among others. The frequency band can be defined by one or more communication protocols or standards such as 802.xx or similar standards. Each of the frequency bands can be sub-divided into one or more communication channels. As an example, the 2.4 GHz band can comprise frequencies between 2400 MHz and 2500 MHz and can be divided into 14 sub channels (e.g., 20 MHz sub-band channels). As such, the gateway 304 and/or one or more nodes 302a, 302b, 302c, 302d can be configured to transmit and receive wireless signals over a select one or more of the channels of a particular frequency band. As an example, a first signal 307a can be received by the node 302b from the user device 303a and a second signal 307b can be received by the node 302b from the user device 303b. In certain aspects, the first signal 307a and the second signal 307b can be received over the same communication channel (e.g., frequency band and/or sub-band). Other signals and interference from nodes 302a, 302c, 302d and other devices in the area may be received and/or may contribute to noise of the signals 307a, 307b.

In an aspect, as more user devices 303a, 303b and/or nodes 302a, 302b, 302c, 302d communicate over the same channel, the co-signals being transmitted over the same channel can cause congestion and poor network performance for one or more of the user devices 303a, 303b and the nodes 302a, 302b, 302c, 302d. As an example, the node 302b can attenuate one or more co-channel signals 307a, 307b below a receiver noise floor, thus making a carrier sense mechanism of the node 302b immune to the presence of the competing co-channel signals. Such attenuation can be effected by a control device local to the node 302b or in response to a signal received from a remote processor configured to determine the appropriate attenuation value. As another example, the node 302b can configure a transmitter power of the transmission signal 312 based on the attenuation level of the received signals (e.g., dB-for-dB with the value of attenuation placed in the receive path(s)). As a further example, any number of the nodes 302a, 302b, 302c, 302d can be configured to attenuate a receiver channel and may adjust transmission to minimize the signal noise over particular channels.

Figure 4:
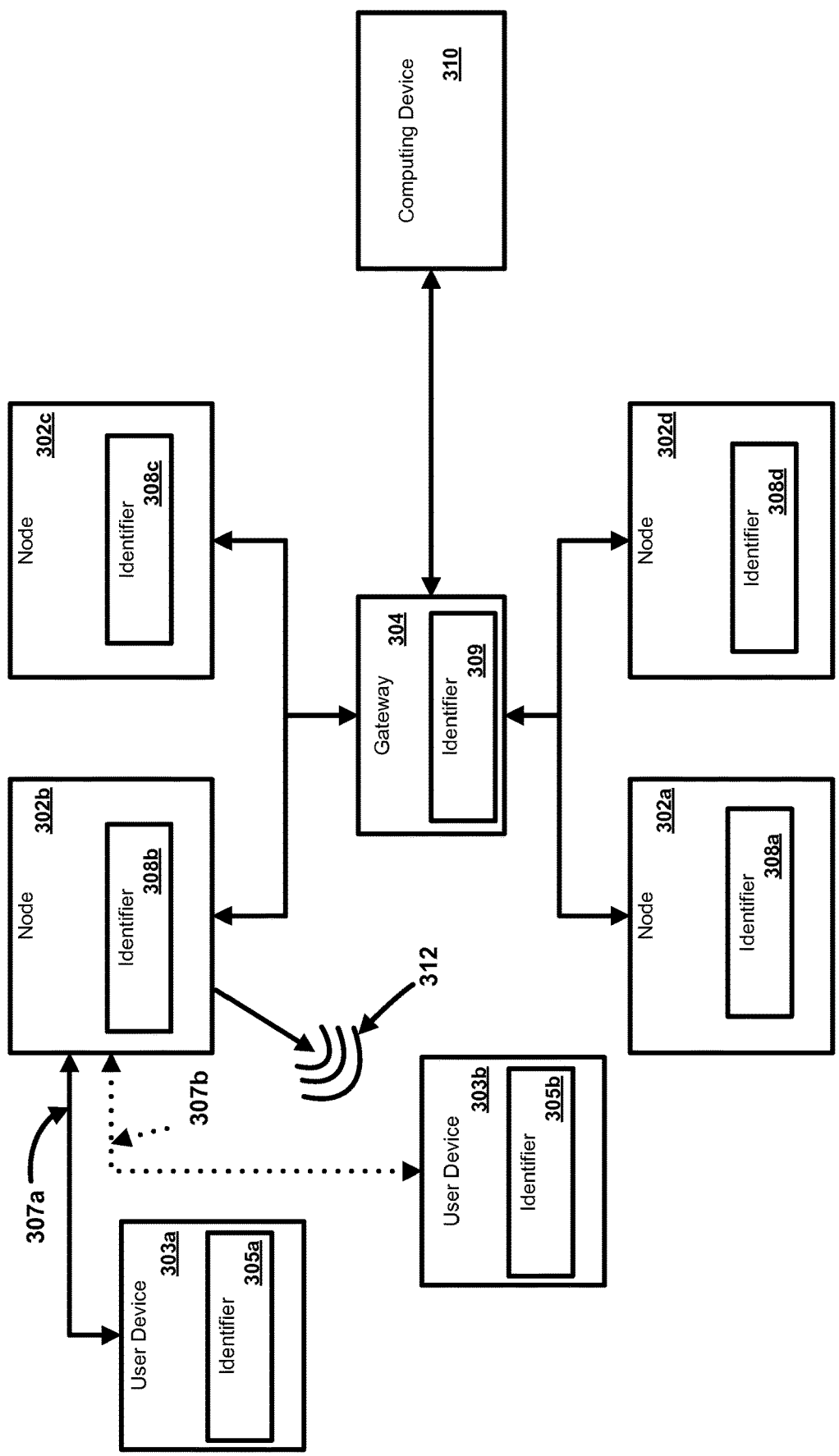
FIG. 4 is a block diagram of an exemplary system and network.

Referring now to FIG. 4, the signals 307a, 307b can be attenuated to remove at least one of the signals 307a, 307b from processing by the node 302b. For example, if the receiving paths of the node 302b are attenuated by a predetermined level (e.g., −20 dB), for example, based on a distribution of RSSI between one or more user devices 303 and nodes 302, some of the lower powered signals may be attenuated below a preset noise floor (e.g., −90 dBm) of the node 302b. As such, the network performance (e.g., downlink performance) of the node 302b can be improved by trading off an amount of downlink power at the receiver of the node 302b device for significantly less channel congestion. In dense radio frequency (RF) environments, such as multi-story apartment buildings, where downlink signal strengths are strong to connected user devices 303, this tradeoff offers an opportunity for the network device to gain access to the channel for downlink transmissions.

This technique can be used to attenuate any signals that may be received via a receiving path of the node 302b or that may contribute to noise on a receiving path of the node 302b is tuned. As an example, a signal-to-noise ratio on a particular channel may be minimized by pushing lower powered signals below a noise floor of a recipient device (e.g., node 302b in the above example). As such, the transmission of other nodes 302b, 302c, 302d and the other user devices 303 may be effectively eliminated from being processed by the node 302b, thereby dedicating the localized communication channel to the more powerful signals, for example, signals between the node 302b and the user device 303a. Each node 302a, 302b, 302c, 302d can be configured based on wireless signals within reception of the respective node 302a, 302b, 302c, 302d and may be configured individually or as a group.

Figure 5:
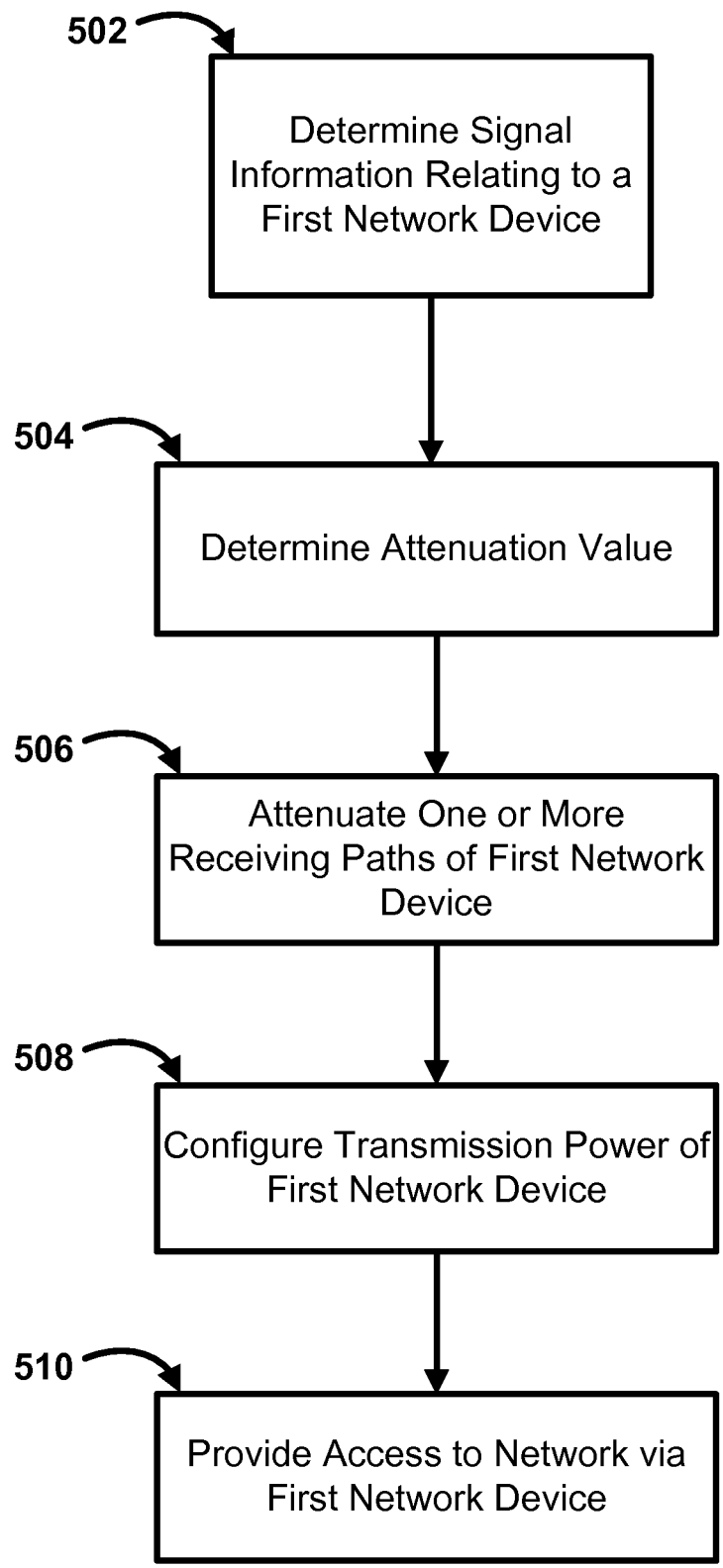
FIG. 5 is a flow chart of an exemplary method.

An exemplary method is shown in FIG. 5. In step 502, signal information can be determined, for example, via one or more of a user device (e.g., user device 102 (FIG. 1)) and a computing device (e.g., computing device 104, network device 116 (FIG. 1)) such as a network computing device. The signal information can be determined via a signal scan such as an RF scan of network signals being transmitted in a given area. As an example, the user device and/or the computing device may be configured with a logical tool (e.g., RF scan) that can receive one or more transmitted wireless signals and can extract the signal information for each of the one or more transmitted wireless signals. As a further example, a remote device can be configured with the logical tool and can transmit information relating to the one or more received wireless signals to the network computing device for processing the signal information.

The signal information can relate to a first network device such as a wireless access point (e.g., network device 116 (FIG. 1)). At least a portion of the signal information can be associated with a first network. In an aspect, the signal information can relate to signal strength, signal identifiers, noise, or a combination thereof. The methods and systems described herein can use an RF scan to determine a number of signal transmissions (e.g., service set identifiers (SSID)) that are being transmitted via one or more communication channels. The RF scan can also determine a received signal strength indicator (RSSI) associated with one or more of the SSIDs. As an example, a distribution of RSSI (signal strength) can be determined for one or more of the network devices 116 (FIG. 1).

In step 504, an attenuation value can be determined for one or more receiving paths of the first network device (e.g., network device 116 (FIG. 1)). The attenuation value can be determined via one or more of a user device (e.g., user device 102 (FIG. 1)), a computing device (e.g., computing device 104 (FIG. 1), and/or the first network device. In an aspect, the attenuation value can be determined based at least on the determined signal information. Various strategies can be used to determine the attenuation value such as discrete dB steps, configurable by the device vendor or network operator. For example, based on the signal information determined in step 502, a particular device (e.g., user device and/or first network device) may be capable of receiving four distinct wireless signals, having a signal strength of −60 dB, −70 dB, −85 dB, and −89 dB respectively. A noise floor for the first network device may be established at −90 dB and signals with a strength of less than −90 dB may be ignored by the first network device. Accordingly, an attenuation value step of −3 dB can be implemented to remove certain wireless signals from processing by the first network device.

Another strategy for determining the attenuation value can include calculating the attenuation value as a function of a statistical distribution of received wireless signals. As such, the attenuation value can be configured to exclude the bottom "x-percentile" of received signals (e.g., readable SSIDs) from being received by one or more devices, such as user device. As an example, a user device may discover ten wireless signals, each associated with a distinct SSID and having a signal strength of −50 dB, −55 dB, −60 dB, −65 db, −70 db, −80 dB, −81 dB, −82 dB, −83 dB, and −84 dB, respectively. An exclusion rule can be used to filter the lowest fifty percent of receivable wireless signals. Applying such a rule to the example signal strength requires an attenuation value of −10 dB to push the bottom fifty percent of the received signals below the noise floor of −90 dB. Accordingly, the attenuation value can be determined to be −10 dB. As a further example, the first network device may determine the signal strength of a received signal associated with particular SSIDs and can determine the attenuation value based on the distribution of the received signals.

Another strategy for determining the attenuation value can include a configurable value based on historical and/or real-time data collected in various environments. For example, a single family home environment may have a different attenuation value strategy than a multi-unit dwelling with hundreds of apartments in close proximity to each other. As such, the attenuation value can be determined based on the environment of the first network device.

In step 506, the one or more receiving paths of the first network device can be attenuated. Such attenuation can be based on the determined attenuation value. As another example, the receiving paths of the first network device can be attenuated via one or more programmable electronic attenuators (e.g., stepped, updated, self-adapting, etc.), one or more PIN diodes (e.g., diode switched attenuator), and may be controlled locally or via upstream intelligence. As a further example, the first network device can have a configurable limit imposed by a vendor or network operator to limit the extent of adjustment to receiver sensitivity and transmit power, or incremental amounts of compensation that can be imposed by the user or network operator to improve performance where channel activity exceeds a threshold.

As an illustrative example, the first network device may be capable of receiving four distinct wireless signals, having a signal strength of −60 dB, −70 dB, −85 dB, and −89 dB respectively. By applying a first attenuation step of −3 dB to one or more receiving paths of the first network device, the received signal strengths become −63 dB, −73 dB, −88 dB, and −92 dB, respectively. The signals have signal strength of −63 dB and −73 dB may be minimal affected, while the signal having a signal strength of −92 dB may fall below the noise floor and may be ignored by the first network device. Applying a second attenuation step of −3 dB may further eliminate another signal by pushing the signal strength to −91 dB, below the noise threshold.

In step 508, a transmission power of the first network device can be configured. In an aspect, the transmission power can be configured based on the determined attenuation value, such as a dB-to-dB adjustment with the determined attenuation value. As an example, if the receive paths of the first network device are attenuated by −3 dB, the transmission power of one or more radio signals of the first network device may be attenuated by −3 dB. In step 510, access to a first network can be provided to one or more devices via the first network device.

Figure 6:
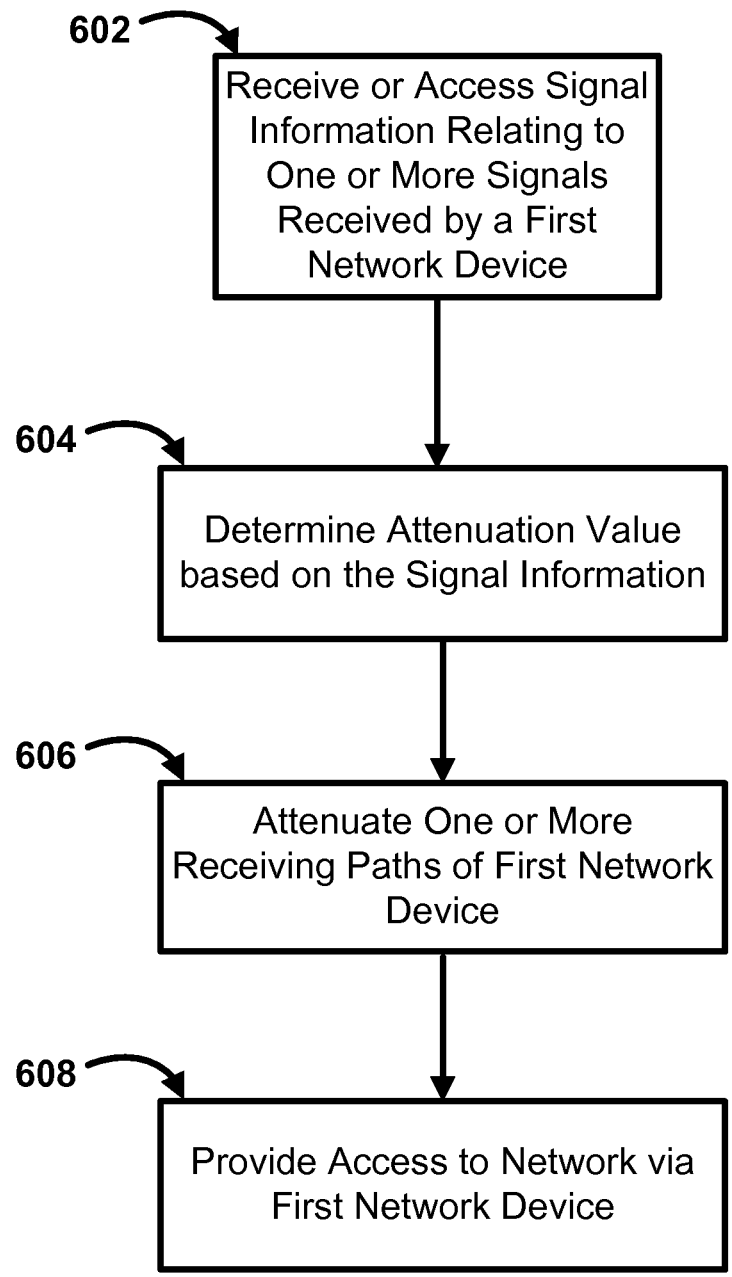
FIG. 6 is a flow chart of an exemplary method.

An exemplary method is shown in FIG. 6. In step 602, signal information can be accessed or received, for example retrieved from storage or accessed via one or more of a user device (e.g., user device 102 (FIG. 1)) and a computing device (e.g., computing device 104, network device 116 (FIG. 1)) such as a network computing device. The signal information can relate to a first network device such as a wireless access point (e.g., network device 116 (FIG. 1)). At least a portion of the signal information can be associated with a first network. In an aspect, the signal information can relate to signal strength, signal identifiers, noise, or a combination thereof. The methods and systems described herein can use an RF scan to determine a number of signal transmissions (e.g., service set identifiers (SSID)) that are being transmitted via one or more communication channels. The RF scan can also determine a received signal strength indicator (RSSI) associated with one or more of the SSIDs. As an example, a distribution of RSSI (signal strength) can be determined for one or more of the network devices 116 (FIG. 1).

In step 604, an attenuation value can be determined for one or more receiving paths of the first network device (e.g., network device 116 (FIG. 1)). The attenuation value can be determined via one or more of a user device (e.g., user device 102 (FIG. 1)), a computing device (e.g., computing device 104 (FIG. 1), and/or the first network device. In an aspect, the attenuation value can be determined based at least on the determined signal information. Various strategies can be used to determine the attenuation value such as discrete dB steps, configurable by the device vendor or network operator. Another strategy for determining the attenuation value can include calculating the attenuation value as a function of a statistical distribution of received wireless signals. As such, the attenuation value can be configured to exclude the bottom "x-percentile" of received signals (e.g., readable SSIDs) from being received by one or more devices, such as user device.

In step 606, the one or more receiving paths of the first network device can be attenuated. Such attenuation can be based on the determined attenuation value. As another example, the receiving paths of the first network device can be attenuated via one or more programmable electronic attenuators (e.g., stepped, updated, self-adapting, etc.), one or more PIN diodes (e.g., diode switched attenuator), and may be controlled locally or via upstream intelligence. As a further example, the first network device can have a configurable limit imposed by a vendor or network operator to limit the extent of adjustment to receiver sensitivity and transmit power, or incremental amounts of compensation that can be imposed by the user or network operator to improve performance where channel activity exceeds a threshold. In step 608, access to a first network can be provided to one or more device via the first network device.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:
1. A method comprising:
 determining signal information associated with received signals, wherein at least a portion of the signal information is associated with a radio frequency signal strength over a communication channel associated with a network device;
 determining an attenuation value based at least on the signal information;
 attenuating, by the network device, one or more radio frequency receiving paths of the network device based in part on applying the determined attenuation value to the one or more radio frequency receiving paths of the network device; and configuring a transmission power of the network device based on the determined attenuation value.

2. The method of claim 1, wherein the received signals are received from a plurality of signal sources.

3. The method of claim 1, wherein the signal information comprises a received signal strength indication distribution comprising signal strength from a plurality of signal sources.

4. The method of claim 3, wherein one or more of the plurality of signal sources is associated with a service set identifier, the method further comprising updating the received signal strength indication distribution by scanning the communication channel for a beacon associated with the service set identifier.

5. The method of claim 1, wherein determining the attenuation value comprises determining the attenuation value satisfies a predetermined threshold.

6. The method of claim 1, wherein the attenuating the one or more radio frequency receiving paths comprises attenuating one or more other received signals by the attenuation value in steps until the one or more other received signals comply with a noise threshold of -90 decibels.

7. The method of claim 1, wherein the attenuating the one or more radio frequency receiving paths comprises attenuating the one or more radio frequency receiving paths using one or more of a pin diode or a programmable electronic attenuator.

8. The method of claim 1, wherein the configuring the transmission power of the network device comprises reducing the transmission power of the network device by the attenuation value.

9. A method comprising:
receiving signal information associated with a plurality of signals received via a communication channel associated with a network device, wherein at least a portion of the signal information is associated with a radio frequency signal strength distribution over the communication channel, and wherein the radio frequency signal strength distribution comprises signal strength from a plurality of signal sources of the received signals;

determining an attenuation value based at least on the signal information; and attenuating, by the network device, one or more radio frequency receiving paths of the network device based in part on applying the determined attenuation value to the one or more radio frequency receiving paths of the network device.

10. The method of claim 9, wherein the determining the attenuation value comprises determining the attenuation value satisfies a predetermined threshold.

11. The method of claim 9, wherein one or more of the plurality of signal sources is associated with a service set identifier, the method further comprising updating the radio frequency signal strength distribution by scanning the communication channel for a beacon associated with the service set identifier.

12. The method of claim 9, wherein the network device comprises a wireless access point and wherein the signal information is associated with channel information, signal strength, signal identifiers, noise, or a combination thereof.

13. The method of claim 9, wherein the attenuating the one or more radio frequency receiving paths of the network device comprises excluding a determined portion of the received signals by causing a respective signal strength of the determined portion of the received signals to comply with a noise threshold.

14. The method of claim 9, wherein the attenuating the one or more radio frequency receiving paths comprises attenuating one or more received signals by the attenuation value in steps until the one or more received signals complies with a noise threshold of -90 decibels.

15. The method of claim 9, wherein the attenuating the one or more radio frequency receiving paths comprises attenuating the one or more radio frequency receiving paths using one or more of a pin diode or a programmable electronic attenuator.

16. A network device comprising:
one or more processors; and
memory storing instructions that, when executed by the one or more processors, cause the network device to:
determine signal information associated with radio frequency signals received via a communication channel associated with a network device, wherein at least a portion of the signal information is associated with a radio frequency signal strength distribution over the communication channel, and wherein the radio frequency signal strength distribution comprises signal strength from a plurality of signal sources;
determine an attenuation value based at least on the signal information;
attenuate the one or more radio frequency communication paths of the network device based in part on applying the determined attenuation value to the one or more radio frequency communication paths of the network device; and
cause a transmission power of the network device to be reduced based on the determined attenuation value.

17. The network device of claim 16, wherein one or more of the plurality of signal sources is associated with a service set identifier, wherein the instructions, when executed, further cause the network device to update the radio frequency signal strength distribution by scanning the communication channel for a beacon associated with the service set identifier.

18. The network device of claim 16, wherein the signal information is associated with channel information, signal strength, signal identifiers, noise, or a combination thereof, and wherein the instructions, when executed, cause the network device to determine the signal information by performing a radio frequency scan of a plurality of signals transmitted in an area.

19. The network device of claim 16, wherein the attenuation value is configured to exclude a determined portion of signals from the signal sources by causing a respective signal strength of the determined portion of signals to comply with a noise threshold.

20. The network device of claim 16, wherein the instructions, when executed, cause the network device to attenuate one or more other received signals by the attenuation value in steps until the one or more other received signals complies with a noise threshold of -90 decibels.

* * * * *